United States Patent [19]

Kondo et al.

[11] 4,399,801
[45] Aug. 23, 1983

[54] OVERRUN PREVENTION IGNITION SYSTEM WITH IGNITION ANGLE RETARDATION CIRCUIT

[75] Inventors: Tadasige Kondo; Susumu Ono, both of Tokyo; Kenichi Takata, Musashino, all of Japan

[73] Assignee: Kioritz Corporation, Japan

[21] Appl. No.: 310,706

[22] Filed: Oct. 13, 1981

[30] Foreign Application Priority Data

Oct. 17, 1980 [JP] Japan .......................... 55/147126[U]

[51] Int. Cl.³ ........................... F02P 1/08; F02P 3/06; F02D 5/04
[52] U.S. Cl. ................................... 123/603; 123/601; 123/602
[58] Field of Search ............... 123/603, 602, 601, 599, 123/427, 406

[56] References Cited

U.S. PATENT DOCUMENTS

| | | | |
|---|---|---|---|
| 3,447,521 | 6/1969 | Piteo | 123/602 |
| 3,667,441 | 6/1972 | Cavil | 123/601 |
| 3,911,889 | 10/1975 | Nagasawa | 123/603 |
| 3,955,549 | 5/1976 | Burson | 123/603 |
| 4,014,309 | 3/1977 | Nagasawa | 123/603 |
| 4,170,207 | 10/1979 | Boyama | 123/602 |
| 4,344,395 | 8/1982 | Kondo et al. | 123/602 |

*Primary Examiner*—Raymond A. Nelli
*Attorney, Agent, or Firm*—Karl W. Flocks

[57] ABSTRACT

Our overrun prevention ignition system of the capacitor discharge type includes an ignition angle retarding circuit for retarding the ignition angle by an overlapping period between an ignition signal and a predetermined conduction period of a switching transistor associated with an ignition controlling thyristor. The ignition angle retarding circuit includes an ignition signal generating coil sharing a common core with a magneto and includes a capacitor which is charged by a portion of an ignition signal from the ignition signal generating coil. The capacitor discharges for a certain period upon commencement of the decay of the ignition signal to produce a supplemental ignition signal thereby to effectively lengthen the width of the ignition signal. A switching transistor connected to the gate of the ignition controlling thyristor is maintained conductive for a predetermined period of time irrespective of the engine speed to bypass the ignition signal during this period. When the engine rotational speed exceeds a normal speed region and the interval between successive ignition signals is shortened, the ignition signal overlaps with the predetermined conduction period of the switching transistor and the ignition angle is retarded by the overlapping period. Since the width of the ignition signal is effectively lengthened by the supplemental ignition signal, a large retardation angle can be obtained to ensure prevention of the overrun of the engine.

3 Claims, 3 Drawing Figures

OVERRUN PREVENTION IGNITION SYSTEM WITH IGNITION ANGLE RETARDATION CIRCUIT

BACKGROUND OF THE INVENTION

1. Field of the Invention

The present invention relates to a capacitor discharge type ignition system for an internal combustion engine, and more particularly to an overrun prevention ignition system having an ignition angle retardation circuit.

2. Description of the Prior Art

An ignition system having an ignition angle retardation circuit to prevent the overrun of an engine is known, for example by Japanese Published Unexamined Patent Application No. 55-5451. In this type of ignition system, an auxiliary capacitor is charged in parallel with the charging of a main capacitor (or a charging capacitor) and the charge stored is discharged through a discharging circuit connected to a base of a switching transistor which is connected in parallel with a gate-cathode circuit of a main thyristor (or ignition controlling thyristor). In this manner the switching transistor is rendered conductive for a predetermined time period. As the rotation of the engine increases to shorten a period of a reverse electromotive force of a generator coil which serves as an ignition signal, the ignition signal partially overlaps the predetermined (constant) conduction period of the switching transistor. Thus, the ignition timing is delayed by the overlapping period. A component (opposite phase electromotive force) of the elecytromotive force generated in the generator coil of a magneto, which is opposite to the electromotive force component to charge the main capacitor is used as the ignition signal to trigger the main thyristor. In order to attain a sufficient amount of retardation angle, it is necessary to increase the overlapping period of the ignition signal and the constant conduction period of the switching transistor. As a result, it is necessary to generate the ignition signal having a long effective duration (a width during which the signal exceeds a trigger level). This requirement may be met to some extent by the selection of the dimensions of a magnet rotor and a core of the magneto but there is a limitation. It is also possible to wind on the magnet rotor of the magneto a special signal coil which can generate an ignition signal of longer duration but this results in an increase in the dimensions of the magneto and the signal coil.

SUMMARY OF THE INVENTION

It is an object of the present invention to provide an overrun prevention ignition system providing a sufficient amount of retardation angle, which can attain the same effect as attained by a long duration signal, by using a conventional signal generating coil which generates a short duration ignition signal.

According to the present invention, in an ignition system in which a switching transistor for bypassing the ignition signal is rendered conductive for a constant time period, and as the rotation of the engine increases and enters an overrunning region, a leading edge of the ignition signal generated by a signal generating coil wound on a magnet rotor which is shared with the magneto partially overlaps the constant conduction period of the switching transistor so that the ignition timing is retarded by the overlapping time period; a thyristor is connected between a terminal of the main capacitor connected to the generator coil of the magneto and a gate of the main thyristor to supply a portion of the charge stored in the main capacitor to the gate-cathode circuit of the main thyristor as a supplementary ignition signal in response to the signal of the signal generating coil, or a capacitor to be charged by the signal of the signal generating coil is provided so that the charge stored in the capacitor is supplied to the gate-cathode circuit of the main thyristor as the supplementary ignition signal. The supplementary signal is generated following to the signal from the signal generating coil and lasts for a predetermined time period. As a result, it has the same effect as if the duration of the short duration ignition signal from the signal generating coil were lengthened. The resulting long duration ignition signal (the signal from the signal generating coil plus the supplementary ignition signal) is bypassed by the switching transistor during the constant conduction period of the switching transistor so that it is not applied to the gate-cathode circuit of the main thyristor, but when the constant conduction period terminates, it is applied to the gate-cathode circuit of the main thyristor to serve as the ignition signal to trigger the main thyristor. Accordingly, although the ignition signal generated by the signal generating coil is an ordinary short duration signal, the same effect as if the long duration ignition signal were generated by the signal generating coil is attained by providing the circuit for generating the supplementary ignition signal.

DESCRIPTION OF THE PREFERRED EMBODIMENTS

The preferred embodiments of the present invention will now be explained with reference to the accompanying drawings.

Figure 1:
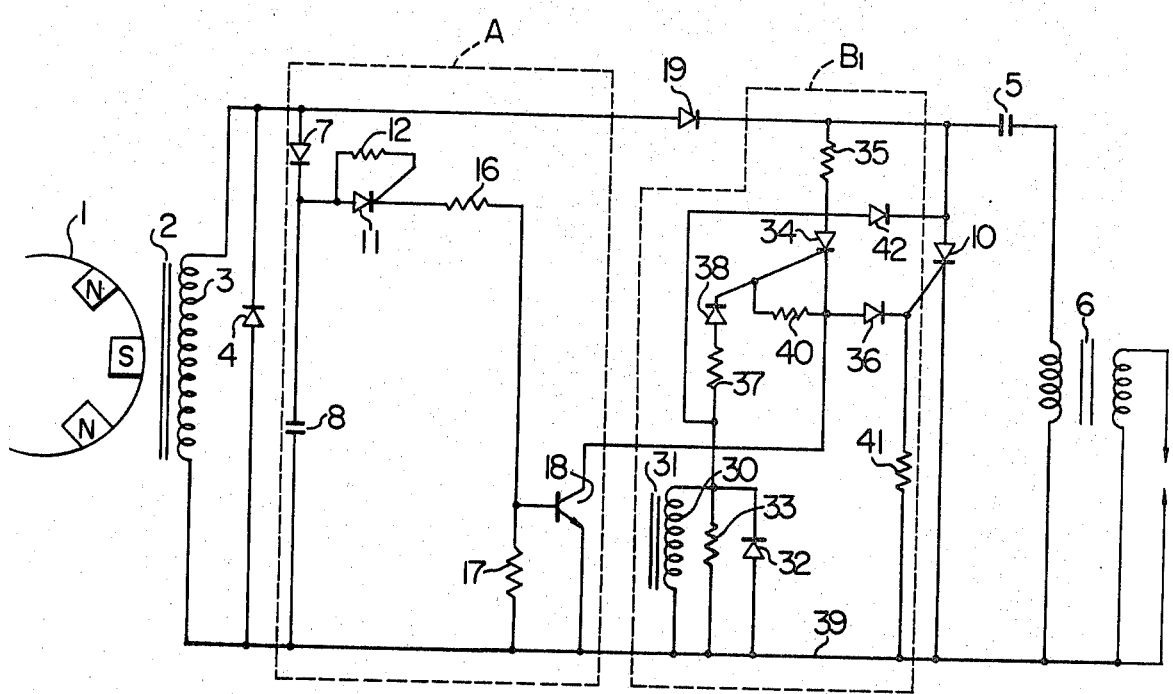
FIG. 1 shows a circuit diagram of a first embodiment of the present invention.

FIG. 1 shows a first embodiment which is substantially identical to a conventional capacitor discharge type ignition system except circuit sections A and $B_1$ (to be described later) for preventing the overrun. It incredes a magneto 1, 2, 3, a main capacitor 5, a main thyristor 10 and an ignition coil 6. The magneto comprises a rotor 1, a core 2 and a generator coil 3. The main capacitor 5 is charged by a forward electromotive force generated in the generator coil 3, and the main thyristor 10 is triggered by an ignition signal from a signal generating coil to be described later. The charge stored in the main capacitor 5 is discharged through the main thyristor 10 and a primary winding of the ignition coil 6 to induce a high voltage in a secondary winding. A backward electromotive force generated in the generator coil 3 passes through a diode 4 and does not function as the ignition signal.

The circuit A of the circuit sections A and $B_1$ for preventing the overrun includes a switching transistor 18 for bypassing the ignition signal to be applied to the main thyristor 10 and serves to maintainthe switching transistor 18 conductive for a constant time period independently of the rotational speed of the engine. It may be a known circuit (such as that disclosed in Japanese Published Unexamined Patent Application No.

55-5451). In the circuit A, in parallel with the charging of the main capacitor 5 by the electromotive force of the generator coil 3 through a diode 19, an auxiliary capacitor 8 having a capacitance which is sufficiently smaller than the capacitance of the main capacitor 5 is charged through a diode 7. Immediately after charging, the charged voltage in the capacitor 8 and the charged voltage in the main capacitor 5 are substantially equal. The charged voltage of the main capacitor 5 is kept constant until the main thyristor 10 conducts. On the other hand, when a current flowing through a resistor 12 connected to a gate of a thyristor 11 reaches a gate triggering current of the thyristor 11 during the discharging of the capacitor 8, the thyristor 11 conducts and the charge in the capacitor 8 discharges through the thyristor 11 and resistors 16 and 18. Since the capacitors 5 and 8 are charged in parallel, peak charge voltages of those capacitors are equal.

Since the resistor 17 is connected in parallel with a base-emitter circuit of the transistor 18, the discharging current of the capacitor 8 flows through the resistor 17 as well as the base-emitter circuit of the transistor 18.

Through the discharging, the charged voltage of the capacitor 8 drops and a current in the anode-cathode circuit of the thyristor 11 decreases as the charged voltage drops. When this current falls below a holding voltage of the thyristor 11, the thyristor 11 is rendered non-conductive.

During the conduction of the thyristor 11, only the charge in the capacitor 8 is discharged. This type of capacitor discharge type ignition system is usually designed such that the charged voltage of the charging capacitor 5 is maintained substantially constant independently of the rotational speed of the engine in a normal rotational speed region of the engine. Accordingly, the peak value of the charged voltage of the capacitor 8 is equal to the charged voltage of the capacitor 5 and constant relative to the rotational speed of the engine. Since the capacitance of the capacitor 8 is constant and the resistances of the resistors 16 and 17 are constant, the conduction period of the thyristor 11 is constant independently of the change in the rotational speed of the engine. During this period, the discharging current of the capacitor 8 flows through the base-emitter circuit of the transistor 18 so that a voltage between the base and the emitter rises to render the base-emitter circuit conductive.

The circuit $B_1$ includes a conventional ignition signal generating circuit which generates a short duration signal and a circuit for generating a supplementary ignition signal which effectively lengthens the duration of the ignition signal. The ignition signal generating circuit includes a signal coil 30 which shares the magnet rotor 1 of the magneto, and a core 31. A diode 32 and a resistor 33 are connected in parallel with the signal coil 30 to short that component of an electromotive force generated in the signal coil 30 which is not used as the ignition signal, by the diode 32.

In order to allow to trigger the main thyristor 10 by the discharging current of the main capacitor 5 after the short duration ignition signal from the signal coil 30 has terminated when the rotational speed of the engine enters an overrunning region and the ignition signal partially overlaps the conduction period of the switching transistor 18, a driving thyristor 34 is connected to the anode of the main thyristor 10, that is, to the terminal of the main capacitor 5 connected to the generator coil 3, through a resistor 35 and also connected to the gate of the main thyristor 10 through a diode 36. The output terminal of the signal coil 30 is connected to the gate of the driving thyristor 34 through a resistor 37 and a diode 38 and the other terminal is connected to a return line 39 of the generator coil 3. The collector of the switching transistor 18 is connected to the cathode of the driving thyristor 34. A resistor 40 is connected in parallel with the gate-cathode circuit of the driving thyristor 34. A diode 42 is connected between the output terminal of the signal coil 30 and the anode of the main thyristor 10 to bypass the electromotive force of the signal coil 30 after the conduction of the main thyristor 10 by the electromotive force of the signal coil 30, through the main thyristor 10 in order to protect the gates of the main thyristor 10 and the driving thyristor 34.

In the operation, in the normal rotational speed region of the engine, the ignition signal from the signal coil 30 flows through the resistor 37, the diode 38, the gate-cathode circuit of the driving thyristor 34, the diode 36 into the gate-cathode circuit of the main thyristor 10 to directly trigger the main thyristor 10. The driving thyristor 34 is simultaneously triggered so that the discharging current of the main capacitor 5 flows through the resistor 35, the thyristor 34, the diode 36, the gate-cathode circuit of the main thyristor 10 into the primary winding of the ignition coil 6. As a result, the main thyristor 10 is triggered to carry out the ignition operation.

Figure 2:
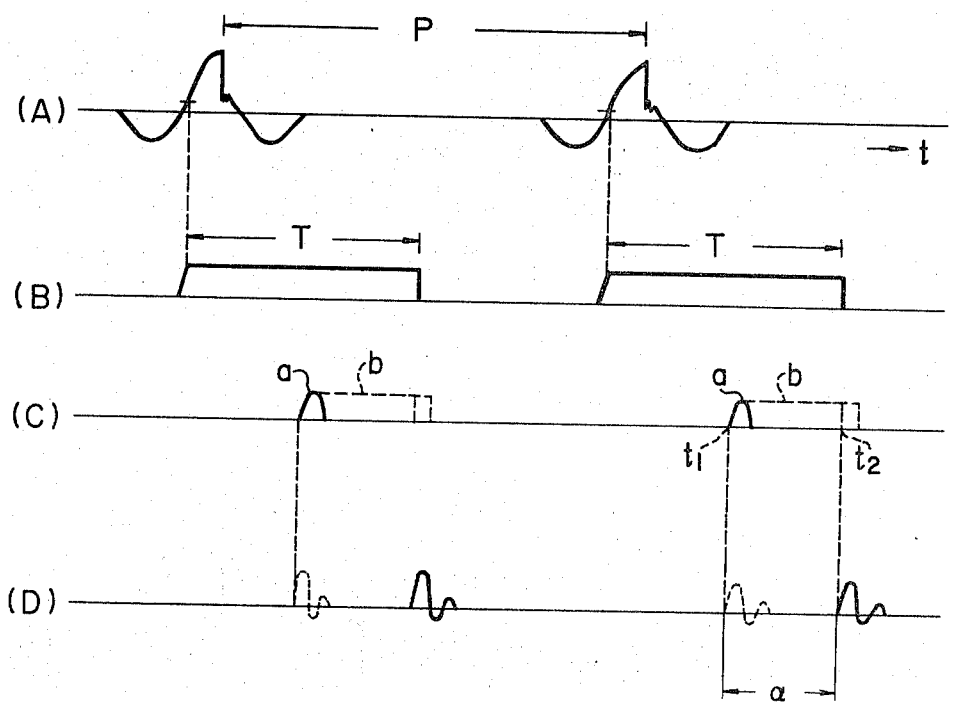
FIG. 2 shows waveforms of signals at various points for illustrating the operation of the first embodiment.

FIG. 2 shows waveforms for explaining the angle retardation operation in the overrunning region. FIG. 2 in (A) shows the electromotive force of the generator coil 3 of the magneto, FIG. 2 in (B) shows the constant conduction period T of the switching transistor 18, FIG. 2 in (C) shows the ignition signal a generated by the signal coil 30 and the supplementary ignition signal b, and FIG. 2 in (D) shows a voltage induced in the secondary winding of the ignition coil 6. As the rotational speed of the engine increases and enters the overrunning region, the ignition signal a partially overlaps the constant period T of the switching transistor 18. Since the switching transistor 18 is conducting at this time, the ignition signal from the signal coil 30 is bypassed through the resistor 37, the diode 38, the gate-cathode circuit of the driving thyristor 34 and the switching transistor 18 so that the main thyristor 10 is not triggered. Since the driving thyristor 34 is simultaneously triggered to conduct, the discharging current of the main capacitor 5 flows through the driving thyristor 34 and the switching transistor 18 so that the thyristor 34 remains conductive.

When the conduction period of the switching transistor 18 is terminated and the switching transistor 18 turns off, that portion of the ignition signal which does not overlap the conduction period flows through the signal coil 30, the resistor 37, the diode 38, the gate-cathode circuit of the driving thyristor 34 and the diode 36 to trigger the main thyristor 10, which in turn carries out the ignition operation. Even if the duration of the ignition signal a is so short that it completely overlaps the conduction period of the switching transistor 18 and no non-overlapped portion is left after the termination of the conduction period, the discharging current of the main capacitors flows through the resistor 35, the driving thyristor 34, the diode 36 and the gate-cathode circuit of the main thyristor 10 upon the turn-off of the switching transistor 18 because the driving thyristor 34 is conducting. Thus the discharging current serves as the supplementary ignition signal b and the main thyristor 10 is triggered upon the termination of the conduction period T of the switching transistor 18 to induce the secondary voltage (FIG. 2 in (D)) in the secondary winding of the ignition coil 6. As the main thyristor 10 conducts, the supplementary ignition signal no longer continues. As a result, the ignition timing is delayed to a time $t_2$ as compared with a time $t_1$ which would occur when the angle retardation circuit is not provided, resulting in a retardation angle of 2.

In the circuit $B_1$, the resistance of the resistor 35 is selected such that a current larger than the holding current of the driving thyristor 34 flows therethrough and a current larger than the gate triggering current of the main thyristor 10 flows therethrough.

Figure 3:
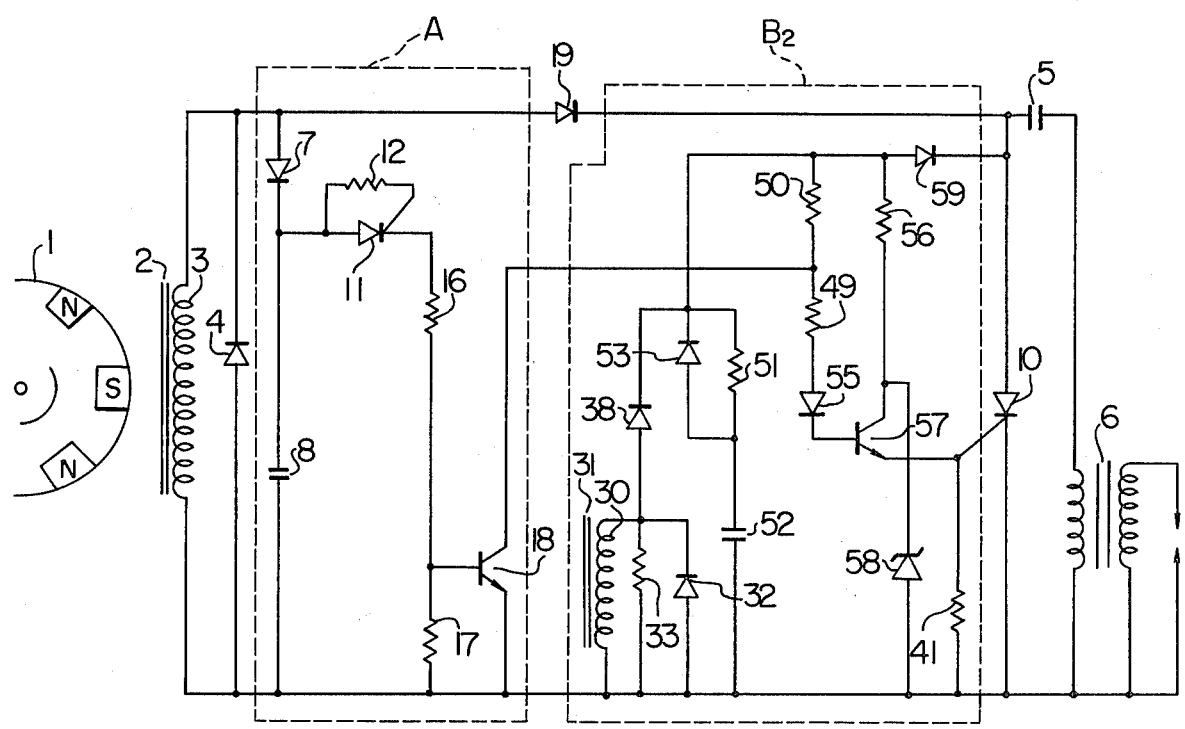
FIG. 3 shows a circuit diagram of a second embodiment.

FIG. 3 shows a second embodiment in which the circuit A is identical to the first embodiment but a circuit $B_2$ differs. In the circuit $B_1$ of the first embodiment, a portion of the charge of the main capacitor 5 triggers the main thyristor 10 through the driving thyristor 34 in order to attain the same effect as if the duration of the ignition signal from the signal coil 30 were lengthened. In the circuit $B_2$ of the present embodiment, a portion of the energy of the ignition signal is stored in a separate capacitor to use it as the supplementary ignition signal for triggering the main thyristor 10. In FIG. 3, the signal coil 30, the core 31, the resistor 33 and the diode 32 are identical to those shown in FIG. 1, An emitter of a transistor 57 is connected to the gate of the main thyristor 10. In order to apply the ignition signal from the output terminal of the signal coil 30 to the gate of the main thyristor 10 through the transistor 57, a parallel circuit is connected to the diode 38. One branch of the parallel circuit comprises a resistor 57 connected to the collector of the transistor 57 and the other branch comprises resistors 50 and 49 and a diode 55 which is connected to the base of the transistor 57. In order to store the portion of the energy of the ignition signal in a capacitor 52 during the conduction period of the switching transistor 18, a resistor 51 which branches from the diode 38 to form a charging path is connected to the capacitor 52. A diode 53 which forms a discharging path of the capacitor 52 is connected in parallel with the resistor 51. In order to bypass the ignition signal through the switching transistor 18 during the conduction period thereof, the junction of the resistors 50 and 49 is connected to the collector-emitter circuit of the switching transistor 18. A Zener diode 58 may be connected to the collector of the transistor 57. A diode 59 is connected between the output terminal of the signal coil 30 and the anode of the main thyristor 10 through the diode 38 to bypass the electromotive force of the signal coil 30 after the main thyristor 10 has been triggered by the electromotive force of the signal coil 30, through the main thyristor 10 to protect the transistor 57 and the gate of the main thyristor 10.

Referring also to FIG. 2, the operation is now explained. In the normal rotational speed region of the engine, the ignition signal from the signal coil 30 flows through the diode 38, thence partly through the resistors 50 and 49 and the diode 55 into the base of the transistor 57 to turn on the transistor 57, and partly through the resistor 56 and the transistor 57 into the gate-cathode circuit of the main thyristor 10 to trigger the main thyristor 10 to carry out the ignition operation.

As the rotational speed of the engine increases and enters the overrunning region the ignition signal a (FIG. 2) partially overlaps the conduction period T (FIG. 2) of the switching transistor 18. If a non-overlapped portion of the ignition signal of the signal coil 30 exists after the termination of the conduction period, it effectively carries out the ignition operation. The operation where the ignition signal of the signal coil 30 is fully covered by the conduction period of the switching transistor 18 is explained below. The ignition signal from the signal coil 30 is bypassed through the diode 38, the resistor 50 and the switching transistor 18 and a portion of the ignition signal charges the capacitor 52 through the diode 38 and the resistor 51. Since the switching transistor 18 is still conducting even after the termination of the ignition signal, the charge stored in the capacitor 52 discharges through the diode 53 which forms the discharging path, the resistor 50 and the switching transistor 18 and does not flow through the resistor 49 and the diode 55 in the other branch into the base of the transistor 57. Accordingly, the transistor 57 is fully cut off so that the main thyristor 10 is not triggered during this period.

When the switching transistor 18 is turned off upon the termination of the conduction period T (FIG. 2), the charge in the capacitor 52 flows through the diode 53, the resistors 50 and 49 and the diode 55 into the base-emitter circuit of the transistor 57 to turn on the transistor 57. As a result, the charge in the capacitor 52 flows through the diode 53, the resistor 56, the transistor 57 into the gate-cathode circuit of the main thyristor 10 to trigger the main thyristor 10 upon the termination of the conduction period T of the switching transistor 18. As a result, the secondary voltage (FIG. 2, (D)) is induced in the secondary winding of the ignition coil 6 and the ignition operation is carried out. Thus, the same effect as if the duration of the signal were lengthened by the time period during which the conduction period of the switching transistor 18 pertains beyond the duration of the ignition signal a is attained and hence the retardation angle α is increased.

While the diode 4 is connected in parallel with the generator coil 3 in the first and second embodiments, it may be replaced by a full-wave rectifier bridge circuit so that the electromotive force to be charged in the main capacitor 5 and the auxiliary capacitor 8 is increased.

As described above, according to the present invention, in the ignition system having the switching transistor which is rendered conductive for the predetermined constant period to bypass the ignition signal which triggers the main thyristor and the conventional signal generating coil which generates the short duration ignition signal; the portion of the charge stored in the main capacitor is supplied to the gate-cathode circuit of the main thyristor through the driving thyristor in response to the ignition signal from the signal generating coil, as the supplementary ignition signal to further pertain the ignition signal, or the portion of the ignition signal from the signal generating coil is stored in the capacitor and the charge stored in the capacitor is supplied to the gate-cathode circuit of the main thyristor upon the termination of the conduction period of the switching transistor. Accordingly, the same effect as if the effective duration of the ignition signal generated by the signal generating coil were lengthened. Consequently, without using a large size magneto or a specially designed signal generating coil, a sufficient amount of retardation angle is attained by adding the relatively simple generation circuit for the supplementary ignition signal so that the overrun of the engine is positively and stably prevented.

What is claimed is:

1. An overrun prevention ignition system in which a main capacitor is charged by one component of an electromotive force of a magneto and the charge stored in said main capacitor is discharged through a primary winding of an ignition coil by triggering a main thyristor to induce a high voltage necessary to ignite an engine in a secondary winding of said ignition coil, said overrun prevention ignition system comprising;

(a) a signal generating coil for generating an ignition signal to trigger said main thyristor, in synchronism with the rotation of said engine, said signal generating coil sharing a magneto rotor with said magneto, (b) a switching circuit connected to a gate circuit of said main thyristor and having a switching transistor for preventing said ignition signal from being applied to the gate of said main thyristor during a conduction period of said switching transistor, (c) a switching transistor control circuit connected in parallel with a series circuit of said main capacitor and said primary winding of said ignition coil to form a discharging circuit for an auxiliary capacitor to be charged in parallel with said main capacitor by said one component of the electromotive force generated in a generator coil of said magneto, said discharging circuit including a first thyristor and a resistor connected in series therewith, one end of said resistor being connected to a base terminal of said switching transistor, said switching transistor control circuit producing a switching signal to render said switching transistor conductive for a predetermined discharging period of said auxiliary capacitor, and (d) a circuit for producing a supplementary ignition signal continuing for a predetermined time period following to said ignition signal from said signal generating coil in response to said ignition signal, an output terminal of said supplementary ignition signal producing circuit being connected to a collector-emitter circuit of said switching transistor and to a gate-cathode circuit of said main thyristor, said supplementary ignition signal being bypassed through said switching transistor during the conduction period of said switching transistor and supplied to the gate-cathode circuit of said main thyristor after the termination of said conduction period.

2. An overrun prevention ignition system according to claim 1 wherein said supplementary ignition signal producing circuit (d) includes a second thyristor having an anode thereof connected to the terminal of said main capacitor connected to said generator coil of said magneto, a cathode thereof connected to the collector-emitter circuit of said switching transistor and to the gate-cathode circuit of said main thyristor and a gate thereof connected to the output terminal of said signal generating coil, said second thyristor being rendered conductive in response to the ignition signal from said signal generating coil to supply a portion of the charge in said main capacitor to the gate-cathode circuit of said main thyristor as said supplementary ignition signal.

3. An overrun prevention ignition system according to claim 1 wherein said supplementary ignition signal producing circuit (d) includes a capacitor connected in parallel with said signal generating coil through a parallel circuit of a resistor and a diode forming a chargeing path and a discharging path, respectively, to said capacitor, the junction of said resistor and said diode of said parallel circuit connected to said signal generating coil being connected to the collector-emitter circuit of said switching transistor and to the gate-cathode circuit of said main thyristor, said capacitor supplying the charge stored therein by the ignition signal from said signal generating coil to the gate-cathode circuit of said main thyristor as said supplementary ignition signal after the termination of the conduction period of said switching transistor.

* * * * *